United States Patent [19]
Iwasaki et al.

[11] Patent Number: 5,506,075
[45] Date of Patent: *Apr. 9, 1996

[54] NON-AQUEOUS ELECTROLYTE SECONDARY BATTERY AND METHOD OF PRODUCING THE SAME

[75] Inventors: Fumiharu Iwasaki, Tokyo; Kensuke Tahara; Hideki Ishikawa, both of Sendai; Seiji Yahagi; Akifumi Sakata, both of Tokyo; Tsugio Sakai, Sendai, all of Japan

[73] Assignees: Seiko Instruments Inc.; Seiko Electronic Components Ltd., both of Japan

[*] Notice: The term of this patent shall not extend beyond the expiration date of Pat. No. 5,395,711.

[21] Appl. No.: 205,948

[22] Filed: Mar. 3, 1994

[51] Int. Cl.⁶ ........................................ H01M 4/48
[52] U.S. Cl. .................. 429/218; 429/197; 429/221; 429/223; 429/224; 429/225
[58] Field of Search ...................... 429/197, 218, 429/221, 223, 224, 225

[56] References Cited

U.S. PATENT DOCUMENTS

| | | | |
|---|---|---|---|
| 4,464,447 | 8/1984 | Lazzari et al. | 429/194 |
| 5,169,736 | 12/1992 | Bittihn et al. | 429/197 X |
| 5,256,504 | 10/1993 | Okuno et al. | 429/197 |
| 5,292,601 | 3/1994 | Sygeno et al. | 429/197 |
| 5,294,503 | 3/1994 | Huang et al. | 429/218 X |
| 5,370,949 | 12/1994 | Davidson et al. | 429/224 |
| 5,395,711 | 3/1995 | Tahara et al. | 429/197 |
| 5,401,599 | 3/1995 | Tahara et al. | 429/218 |

FOREIGN PATENT DOCUMENTS

| | | |
|---|---|---|
| 0484187 | 5/1992 | European Pat. Off. . |
| 0582173 | 2/1994 | European Pat. Off. . |

*Primary Examiner*—Stephen Kalafut
*Attorney, Agent, or Firm*—Adams & Wilks

[57] ABSTRACT

A non-aqueous electrolyte secondary battery has a negative electrode, a positive electrode and a non-aqueous electrolyte with lithium ion conductivity. A composite oxide containing lithium represented by composition formula $Li_xSi_{1-y}M_yO_z$ (where M is one or more kinds of elements selected from metals other than alkaline metals, and metalloids other than silicon, and x, y and z satisfy $0 \leq x$, $0<y<1$, and $0<z<2$) is used as an active material for the negative electrode. The battery exhibits a negative active material with a lower and baser potential and a large charging/discharging capacity to produce a long cycle service life secondary battery which facilitates a large current charging and discharging and reduces deterioration due to excess charging and excess discharging.

24 Claims, 9 Drawing Sheets

NON-AQUEOUS ELECTROLYTE SECONDARY BATTERY AND METHOD OF PRODUCING THE SAME

BACKGROUND OF THE INVENTION

The present invention relates to non-aqueous electrolyte secondary batteries using non-aqueous electrolyte with lithium ion conductivity where material capable of incorporating and releasing lithium is used as a negative active material, and in particular, it relates to novel negative active materials capable of proposing improved high-reliable secondary batteries with a longer service life having a satisfactory charge and discharge characteristic of a high voltage and high energy density.

Non-aqueous electrolyte batteries using lithium as a negative active material have various advantages including high reliability ranging long periods due to smaller amounts of self-discharge in addition to a high voltage and higher energy density, therefore they have widely been used as primary batteries of power supplies for memory backup, cameras and the like. However in recent years, following the remarkable development of portable type electronics equipment and devices, communication equipment and devices and so forth, various kinds of equipment and devices have been realized requiring larger current outputs for batteries as a power supply. It is therefore strongly desired to produce high energy density secondary batteries capable of recharging and redischarging from the view point of economics, compact size, and light-weight of the devices. For this reason, the research and development for more satisfactory non-aqueous electrolyte secondary batteries have been considerably promoted, a part of which is now in practical use, however unsatisfactory characteristics still remain in energy density, charge and discharge cycle service life, and reliability.

Conventionally, as a positive active material constituting a positive electrode of the secondary battery of this kind there have been found three kinds of types depending on charge and discharge reaction patterns. Namely, in the first type, only lithium ions (cation) are input into and output from between layers of the crystal, lattice positions or gaps among lattices of the crystal by means of intercalation and deintercalation reactions and the like as is the case of metal chalcogenide such as $TiS_2$, $MoS_2$, $NbSe_3$ and the like, and metal oxide such as $MnO_2$, $MoO_3$, $V_2O_5$, $Li_xCoO_2$, $Li_xNiO_2$, $Li_xMn_2O_4$, and the like. The second type is a type in which mainly only anion is stably input or output by the doping or undoping reactions as in the case of conductive polymers such as polyaniline, polypyrrole, polyparaphenylene and the like. The third type is a type in which both lithium cation and anion can be input and output as in the case of layer-like structure graphite compounds and conductive polymers such as polyacene and the like (intercalation, deintercalation, or dope, undope or the like).

On the other hand, in the negative active material of the battery of this kind, since the use of metal lithium in a simple substance gives the basest electrode potential, it is preferable that the battery combined with the positive electrode using positive active material as described above has the highest voltage and the highest energy density. However, the problem arises in considerable deterioration with charge and discharge and results in a shorter cyclic life because of the generation of dendrite or passive state compounds on the negative electrode due to the charge and discharge. In order to solve this problem, for the negative active material, various possible materials capable of incorporating and releasing lithium ions are proposed; namely, (1) alloy of lithium with other metals such as Al, Zn, Sn, Pb, Bi and Cd; (2) intercalation compounds or insertion compounds in which lithium ions are incorporated into the crystal structure of inorganic compounds such as $WO_2$, $MoO_2$, $Fe_2O_3$, and $TiS_2$, graphite, and carbonaceous materials obtained by baking organic materials; (3) conductive polymers such as polyacene, polyacetylene and the like in which lithium ions are doped.

However, in general, in case where, as a negative active material, the negative electrode using materials capable of incorporating and releasing lithium ions (other than metal lithium as described above) is combined with the positive electrode using the positive active material described above to constitute a battery, an electrode potential of the negative active material is nobler than an electrode potential of metal lithium, and the drawback therefore arises in that an operating voltage of the battery is lowered than when using metal lithium in the simple substance as a negative active material. For example, the operating voltage is lowered by 0.2 to 0.8 V when using alloys of lithium with Al, Zn, Pb, Sn, Bi, Cd or the like, by 0 to 1 V when using lithium intercalation compound of carbon, and by 0.5 to 1.5 V when using lithium ion insertion compound such as $MoO_2$ or $WO_2$.

Since elements other than lithium are involved as negative electrode constituent elements, the capacity and energy density per volume and weight are considerably lowered.

Further, in case (1) where the alloys of lithium are used with the other metals, a problem occurs because the utilization-efficiency of lithium is low during charge and discharge and repeating charge and discharge causes cracks or breaks in the electrode which results in a shorter cyclic life. It (2) where the battery uses the lithium intercalation compound or insertion compound, deteriorations such as decay of the crystal structure and generation of irreversible substances arise in the case of excess charge and excess discharge, and further there is a drawback of a lower output voltage of the battery because of the higher (nobler) electrode-potential. In case (3), where the conductive polymer is used, the problem is that the charge and discharge capacity, in particular, the charge and discharge capacity per unit volume, is small.

For these reasons, to obtain a secondary battery with a long cyclic service life having a graded charge and discharge characteristic with a high voltage and a high energy density, there is required a negative active material having a larger effective charge and discharge capacity, that is, a larger amount of reversible incorporation and release of lithium ions with a lower (baser) electrode potential for lithium but without deteriorations such as decay of the crystal structure and generation of irreversible substances and the like due to the incorporation and release of the lithium ions during charging and discharging.

SUMMARY OF THE INVENTION

It is an object of the present invention to provide a novel secondary battery which has an upgraded charge and discharge characteristic in larger current with a high voltage and high energy density together with a long cycle service life.

It is another object of the present invention to provide a non-aqueous electrolyte secondary battery comprising at least a negative electrode, a positive electrode, and a non-aqueous electrolyte with lithium ion conductivity, wherein a composite oxide containing lithium represented by a composition formula $Li_xSi_{1-y}M_yO_z$ is used as an active material of said negative electrode, where M is one or more kind(s) of element(s) selected from the group consisting of metal elements other than alkaline metals, and metalloid elements other than silicon, and $0 \leq x$, $0<y<1$, and $0<z<2$ are satisfied. It is still another object of the present invention to provide a method for producing a non-aqueous electrolyte secondary battery comprising at least a negative electrode, a positive electrode, and a non-aqueous electrolyte with lithium ion conductivity, wherein inside the battery after assembling the battery, or inside or outside the battery while producing the battery, a composite oxide represented by a composition formula $Si_{1-y}M_yO_z$ of silicon and element(s) M is electrochemically reacted with lithium or a material containing lithium to incorporate lithium ions into the composite oxide $Si_{1-y}M_yO_z$ and to produce a composite oxide containing lithium represented by a composition formula $Li_xSi_{1-y}M_yO_z$, which is used as an active material of said negative electrode.

To solve the problems as hereinbefore described, the present invention uses a novel material which is capable of incorporating and releasing lithium ions, and represented by a composition formula $Li_xSi_{1-y}M_yO_z$ (where $0 \leq x$, $0<y<1$, $0<z<2$ are satisfied) as a negative active material of batteries of this kind, and which is made of a composite oxide, containing lithium Li, composed of silicon Si and element(s) M being metal(s) other than alkaline metal(s), or/and metalloid(s) other than silicon. Specifically, the material is a composite oxide having the composition in which a ratio "z" of the number of oxygen atoms versus a sum of the number of silicon atoms plus the number of metal or metalloid M atoms is less than 2 and more than 0, containing lithium in the crystal structure or the amorphous structure, composed of silicon and metal or metalloid M, and capable of incorporating/releasing lithium ions by electrochemical reaction within the non-aqueous electrolyte. In this case, a lithium state in the oxide may mainly preferably be in the form of ions, however, it is not always limited to that state of ions. Any range where the composite oxide can stably be present as a lithium content "x" may preferably be available, and in particular preferable for a range of $0 \leq x \leq 4$.

We have found that, as previously described, the silicon oxide containing lithium, represented by a composition formula $Li_xSiO_z$ (where $0 \leq x$, $0<z<2$ are satisfied), is capable of repeatedly incorporating/releasing lithium ions in an electrochemically stable manner in a range of the electrode potential of at least 0 to 3 V for the lithium standard electrode (metal lithium) in the non-aqueous electrolyte, and due to such charge and discharge reactions a considerably higher charge and discharge capacity is provided in a base potential region particularly with 0 to 1 V, by which a graded negative active material is thus produced, which is described as filed in Patent Application (Japanese Patent Application Numbers Hei 5-35851 in 1993 and Hei 5-162958 in 1993). However, according to subsequent researches and developments we have found and filed this application of the invention in which, a part of silicon Si of the silicon oxide, containing the lithium, $Li_xSiO_z$ is allowed to be replaced with element(s) M being metal(s) other than alkaline metal(s) or metalloid(s) other than silicon, or the silicon is added with element(s) M to produce the composite oxide, composed of silicon and element(s) M, containing lithium, with the $Li_xSi_{1-y}M_yO_z$ type where element(s) M is present together with silicon, whereby this produces a larger charge and discharge capacity and a higher charge and discharge efficiency in a base potential region of 0 to 1 V for the lithium standard electrode and simultaneously enables an upgraded charge and discharge characteristic as a negative active material with a smaller polarization (internal resistance).

For the metal or the metalloid M constituting the composite oxide, there can be used transition metals such as Ti, V, W, Mn, Fe, Co, Ni, Cu, and Nb, and metals other than alkaline metal such as Zn, Cd, Mg, Ba, Pb, Sn, and Al, and metalloids other than silicon such as B, C, Ge, Sb, and P. Preferably, a superior charge and discharge characteristic is obtained particularly when using, as M, one or more element(s) selected from the group consisting of transition metals of group IVB to group VIII and both of metals and metalloids of group IIIA and group IVA in the periodic table (Inorganic Chemical Naming for Element(s) published by International Union of Pure and Applied Chemistry, IUPAC, revised in 1989). A ratio "y" of the number of M atoms versus a sum of the number of atoms of metal or metalloid M plus the number of silicon Si atoms in the composite oxide, may preferably be in a range of $0<y<1$. Particularly, depending on kinds of metals or metalloids M, a considerably upgraded charge/discharge characteristic can be obtained in $0<y<0.75$, and more preferably in $0<y<0.5$, therefore these ranges are satisfactory ones. A ratio "z" of the number of oxygen O atoms versus a sum of the number of atoms of metal or metalloid M plus the number of silicon Si atoms, may preferably be in a range of $0<z<2$, and particularly upgraded charge and discharge characteristics can be obtained in case of $0<z \leq 1.5$, therefore these ranges are preferable.

For a preferable method of producing the composite oxide $Li_xSi1-yM_yO_z$ used as a negative active material of the battery according to the present invention, two kinds of methods are proposed as described below. However, it is understood that the invention is not limited to the following methods.

In the first method, silicon, said element(s) M and lithium, or silicon compound, said M element compound and lithium compound are mixed at a predetermined mol ratio, and thereafter or while mixing the same, the resulting mixture is thermal treated in a non-oxidizing atmosphere such as inert atmosphere or vacuum or in an atmosphere controlled with an oxygen amount for obtaining the predetermined oxidation number with respect to silicon, element(s) M and lithium to produce the composite oxide of silicon, element(s) M and lithium. The respective compounds of silicon and element(s) M and lithium to be a starting materials may preferably be the compounds, such as oxide or hydroxide of the respective elements, or salt such as carbonate or nitrate, or organic compounds and the like, which are capable of producing oxide of each element by thermal treating the materials in an non-oxidizing atmosphere. A method of mixing these starting materials, other than a method of directly dry-mixing the powders of each material, is to dissolve or disperse these materials in water, alcohol or the other solvent to be mixed and reacted uniformly in such solution and thereafter to dry them, and another method is to atomize or ionize these materials by heating or electromagnetic wave or light or the like and simultaneously or alternatively to vaporize and deposit the same, and in addition, other various kinds of methods are available. In this way, a temperature of the thermal treatment, after or while these materials are mixed, differs depending on the starting materials or the thermal treatment atmosphere, may be synthesized at a temperature equal to or more than 400° C., more preferably at a temperature equal to or more than 600° C. On the other hand, since there is such a case in which silicon and quadrivalent silicon oxide are generated by disproportionation reactions at a temperature equal to or more than 800° C. in inert atmosphere or vacuum or the like, such case may preferable be placed in a temperature equal to 600° C. to 800° C.

Among the combinations of these starting materials, when, for the lithium supply material, using lithium compound generating lithium oxide by thermal treatment such as lithium oxide $Li_2O$, lithium hydroxide LiOH, salt such as $Li_2CO_3$ or $LiNO_3$, or a hydrate thereof or the like, and when, for the silicon supply source, using a simple substance silicon or silicon with a lower oxide $SiO_{z'}$ (where $0<z'<2$ is satisfied), and when, for the supply material of element(s) M, using a simple substance M or M with a lower valence oxide $MO_z$ (where $0<z''<2$ is satisfied), then the composite oxide is synthesized by thermally-treating the mixture of these in an inert atmosphere or an atmosphere such as a vacuum where oxygen is eliminated, which are particularly preferable for easier production and easier control of the oxygen amount or partial oxygen pressure in the thermal treatment atmosphere.

The composite oxide of silicon and element(s) M thus obtained containing lithium can be used as a negative active material as it is or after processing such as grinding, regulating grain size or granulation or the like. Further, as in the second method described later, there may preferably be employed a method of using a negative active material whose lithium content is increased or decreased in a way that the composite oxide of silicon and element(s) M containing lithium is allowed further to incorporate lithium ions, or to the contrary, to release lithium ions from the composite oxide by electrochemical reaction of the composite oxide of silicon and element(s) M containing lithium with lithium or material containing lithium.

In the second method, composite oxide $Si_{1-y}M_yO_z$ (where $0<y<1$ and $0<z<2$ are satisfied) of silicon and element(s) M which do not contain lithium is previously synthesized, and by electrochemical reaction of the thus obtained composite oxide $Si_{1-y}M_yO_z$ with lithium or material containing lithium, lithium ions are incorporated into the composite oxide $Si_{1-y}M_yO_z$ of silicon and element(s) M to produce composite oxide $Li_xSi_{1-y}M_yO_z$ of silicon and element(s) M containing lithium.

Such composite oxide $Si_{1-y}M_yO_z$ of silicon and element(s) M can be synthesized by thermal treatment as in the first method described above other than in the case where lithium or lithium compound is not added on synthesizing. Specifically, after each simple substance of silicon and element(s) M or compound thereof are mixed at a predetermined mol ratio or while being mixed similarly, such composite oxide is obtained through thermal treatment in a non-oxidizing atmosphere such as inert atmosphere or vacuum or the like, or in an atmosphere where the oxygen amount is controlled to render silicon and element(s) M with the predetermined oxidation number. Each compound of silicon and element(s) M as the starting materials, and each temperature during thermal treatment, and the like are as shown in the first method. Among combinations of these starting materials, when using, as a silicon supply source, silicon simple substance or lower silicon oxide $SiO_{z'}$ (where $0<z'<2$) and when using, as element(s) M supply material, element M simple substance or lower valence M oxide $MO_z$ (where $0<z''<2$), then the composite oxide without lithium can be synthesized by thermal-treatment of the mixture of these materials in an inert atmosphere or vacuum or the like where oxygen is eliminated, and preferably resulting in easier production with easier control of the oxygen amount or partial oxygen pressure in thermal treatment atmosphere and obtaining an upgraded charge and discharge characteristic. In particular, when using a lower valence oxide $MO_{z''}$ as element(s) M as the supply material, whose number of oxygen atoms $z''$ for the number of M atoms satisfies $0<z''<1.5$, and where the number of oxygen atoms z of the composite oxide $Si_{1-y}M_yO_z$ of silicon and the element M after synthesized satisfies $0<z\leq 1.5$, then preferably the resultant mixture obtains an upgraded charge/discharge characteristic in larger current with a smaller polarization in addition to a larger charge and discharge capacity and a higher efficiency.

For materials containing lithium for using in the electrochemical reaction described above, there can be used, for example, an active material capable of incorporating and releasing lithium ions which is used in the positive active material or negative active material or the like described hereinabove with respect to the prior art.

Incorporation of lithium ions into such composite oxide $Si_{1-y}M_yO_z$ of silicon and element(s) M by electrochemical reaction, can be performed within the battery after assembling the battery or inside or outside the battery depending on the production process of the battery, which are described as follows. Namely, in method (1) the composite oxide of silicon and element(s) M or a mixed agent of the same with a conductive agent and a binding agent and the like being formed in a predetermined shape to obtain one side of the electrode (working electrode), while metal lithium or material containing lithium is used as the other side of the electrode (counter electrode). These electrodes are arranged opposing each other in contact with non-aqueous electrolyte with a lithium ion conductivity to constitute the electrochemical cell, and hence a current application is performed with a suitable current in a direction to allow the working electrode to conduct the cathode reaction, thereby the lithium ions are electrochemically incorporated into the composite oxide of silicon and element(s) M. The obtained working electrode is used as a negative electrode as it is, or used as a negative active material constituting a negative electrode to produce the non-aqueous electrolyte secondary battery. (2) is a method in that the composite oxide of silicon and element(s) M or a mixed agent of the same with a conductive agent and a binding agent formed into a predetermined shape, to which lithium or lithium alloy or the like is press fit or contact bonded to produce a laminated electrode, which is used as a negative electrode and assembled into the non-aqueous electrolyte secondary battery. By contacting the laminated electrode with the electrolyte within the battery, a kind of local cell is formed to self-discharge, and the lithium is thus electrochemically incorporated into the composite oxide of silicon and element(s) M. In method (3), a non-aqueous electrolyte secondary battery is constituted in that the composite oxide of silicon and element(s) M is used as a negative active material, a material containing lithium and capable of incorporating and releasing lithium ions is used as a positive active material, thus lithium ions released from the positive electrode by charging while being used as a battery is incorporated into the composite oxide of silicon and element(s) M.

The obtained composite oxide $Li_xSi_{1-y}M_yO_z$ of silicon and element(s) M containing lithium is used as a negative active material.

On the other hand, for the positive active material there can be utilized various kinds of materials capable of incorporating and releasing lithium ions and/or anion, such as metal chalcogenide material of $TiS_2$, $MoS_2$, and $NbSe_2$ and the like, and metal oxide of $MnO_2$, $V_2O_5$, $Li_xCoO_2$, $LixNiO_2$ and $Li_xMn_2O_4$ and the like, and conductive polymer of polyanilin, polypyrrole, polyparaphenylene and polyacen and the like and graphite layer-like structure compound etc.

In particular, the negative electrode using as an active material the composite oxide $Li_xSi_{1-y}M_yO_z$ of silicon and element(s) M containing lithium according to the invention, advantageously has a lower (base) electrode potential for metal lithium and a considerably larger charge and discharge capacity for the base region equal to or less than 1 V. Therefore the secondary battery having a upgraded charge and discharge characteristic with a high voltage and high energy density may more preferably be obtained by combining with positive electrodes having the noble active material, that use an electrode potential equal to or more than 2 V for metal lithium such as the metal oxide or metal chalcogenide, and that more preferably use a (noble) active material having a high potential of 3 V to 4 v in such metal oxides as $V_2O_5$, $MnO_2$, $Li_xCoO_2$, $Li_xNiO_2$ or $Li_xMn_2O_4$.

In particular, together with the negative electrode using as an active material the composite oxide $Li_xSi_{1-y}M_yO_z$ of silicon and element(s) M containing lithium according to the invention is utilized a positive electrode which uses as a positive active material a composite oxide having a layer-like structure containing lithium represented by the composition formula $Li_aT_bL_cO_2$, wherein T represents transition metal element(s), L represents one or more kind(s) of metalloid element(s) selected from boron B and silicon Si, and a, b and c satisfy $0<a\leq1.15$, $0.85\leq b+c\leq1.3$, and $0\leq c$ respectively, thus producing a long cycle life secondary battery particularly having a superior charge and discharge characteristic with a high energy density with less deterioration due to over-charge and over-discharge.

The composite oxide $Li_aT_bL_cO_2$ used for the positive active material of the battery of the invention is obtained by a synthesis process in that each simple substance of lithium Li, transition metal T or element L, or oxide, hydroxide thereof, or salt such as carbonate and nitrate of said simple substances are mixed at a predetermined ratio to be burned at more than 600° C. or at preferably 700° C. to 900° C. in the atmosphere or an atmosphere having oxygen. Thermal synthesis is also available in an inert atmosphere when using the compound having oxygen or the oxide of Li, T and L and the like as a supply source of such element(s). Although about 4 to 50 hours is ordinarily enough to heat, in order to promote the synthesis reaction and to raise its uniformity, it is effective to repeat several times the processes of burning, cooling, grinding and mixing.

In the formula $Li_aT_bL_cO_2$ the standard amount of Li "a" in the heating synthesis described above is a constant composition ratio a=1, but available for non-stoichiometric composition of an extent of ±15%, or also available for $0<a\leq1.15$ by electrochemical intercalation, deintercalation and the like. Co, Ni, Fe, Mn, Cr and V and the like may preferably be used for the transition metal T, in particular, Co and Ni may be preferable for its superior charge and discharge characteristic. The boron and/or silicon amount "c" and transition metal T amount "b" may preferable be $0<c$ and simultaneously $0.85\leq b+c\leq1.3$ for reduction of polarization (internal resistance) on charging and discharging with a considerable effect of cycle characteristic improvement and the like. On the other hand, the charge and discharge capacity at every cycle basis is lowered for an excess amount of the boron and/or silicon amount "c" and is maximum for $0<c\leq0.5$, and thus such range may be preferable.

The electrolyte may preferably be a non-aqueous electrolyte with lithium ion conductivity such as: a non-aqueous (organic) electrolyte solution where a lithium ion dissociation salt such as $LiClO_4$, $LiPF_6$, $LiBF_4$, $LiCF_3SO_3$ as a supporting electrolyte are dissolved in single or mixed solvent of organic solvent such as γ-butyrolactone, propylene carbonate, ethylene carbonate, butylene carbonate, dimethyl carbonate, dimethyl carbonate, methylformate, 1,2-dimethoxyethane, tetrahydrofuran, dioxolane, and dimethylformamide; a polymer solid electrolyte where the lithium salt is a solid soluted into polymer such as polyethylene oxide, polyphosphasen cross-linked substance; or an inorganic solid electrolyte such as $Li_3N$ and LiI etc.

The negative electrode using as an active material the composite oxide $Li_xSi_{1-y}M_yO_z$ of silicon and element(s) M containing lithium, when using non-aqueous electrolyte solution (organic electrolyte solution) containing ethylene carbonate (EC) as an organic solvent, has a graded charge and discharge characteristic to advantageously produce a long cycle service life secondary battery. EC having a higher freezing point may preferably be equal to or less than a volume ratio of 80% for the entire solvent of the electrolyte solution. Because EC is a high viscosity solvent, the electrolyte solution may preferably also contain R.R' type alkyl carbonate (containing R=R') shown by the formula (1) in order to raise ion conductivity and realize more stabilization. Particularly, R and R' being an alkyl group shown by $CnH_{2n+1}$ advantageously has a higher ion conductivity and a lower viscosity in case of n=1, 2, 3, 4, and 5. Among these, dimethyl carbonate (DMC), diethyl carbonate (DEC) and methyl-ethyl-carbonate and the like, where both R and R' in the formula (1) are methyl group(s) (n=1) and/or ethyl group(s) (n=2), are more preferable. Since the maximum ion conductivity is obtained at a mixture ratio of EC and R/R' type alkylcarbonate at its volume ratio of approximately 1:1, the mixture ratio may particularly be preferable on a volume ratio of about 3:1 to 1:3. The supporting electrolyte in the electrolyte solution may be, as formerly described, salt capable of dissociating Li+ ion in the solution without chemical reaction directly with negative and positive electrodes, where the use of $LiPF_6$ or $LiClO_4$ preferably provides a particularly upgraded charge and discharge characteristic. The negative electrode using as an active material the composite oxide of silicon and element(s) M containing lithium according to the present invention, is capable of repeatedly stably incorporating and releasing lithium ions in a range of electrode potential of at least 0 to 3 V for the metal lithium in the non-aqueous electrolyte, such electrode reaction enables it to be utilized as a negative electrode of the secondary battery capable of repeatedly charging and discharging. In particular, by producing the composite oxide where silicon and element(s) M are coexisting, advantages arise in variation of the operation voltage and decrease of the capacity and the like even in large current with smaller polarization on charging and discharging in addition to larger amount of reversibly incorporating and releasing lithium ions, i.e., considerably larger effective charge and discharge capacity and efficiency in a base potential region of 0 to 1 V for a standard lithium electrode (metal lithium) compared to the oxide of only silicon containing lithium $Li_xSiO_z$ or oxide of only an element M $Li_xMO_z$. Further, an extremely stable second battery having a long service life is obtained almost without deterioration due to generation of irreversible substances by the over-charging and over-discharging.

The reason why such superior charge and discharge characteristic is obtained, is not always clear. However, it is estimated as follows. The silicon oxide $SiO_z$ has a larger incorporating and releasing amount of lithium ions, namely, a large charge and discharge capacity, but it has lower electron conductivity because of the insulative substance or semiconductor to be of relatively larger polarization on charging and discharging. On the other hand, it is estimated that the novel negative active material $Li_xSiO_{1-y}M_yO_z$ being the composite oxide according to the invention where silicon and element(s) M coexist, provides a considerable large amount of sites capable of incorporating lithium ions simultaneously together with a higher mobility of lithium ions and higher electron conductivity, which facilitates incorporating and releasing lithium ions.

DESCRIPTION OF THE PREFERRED EMBODIMENTS

The present invention will further be described in detail with reference to embodiments as following.

Figure 1:
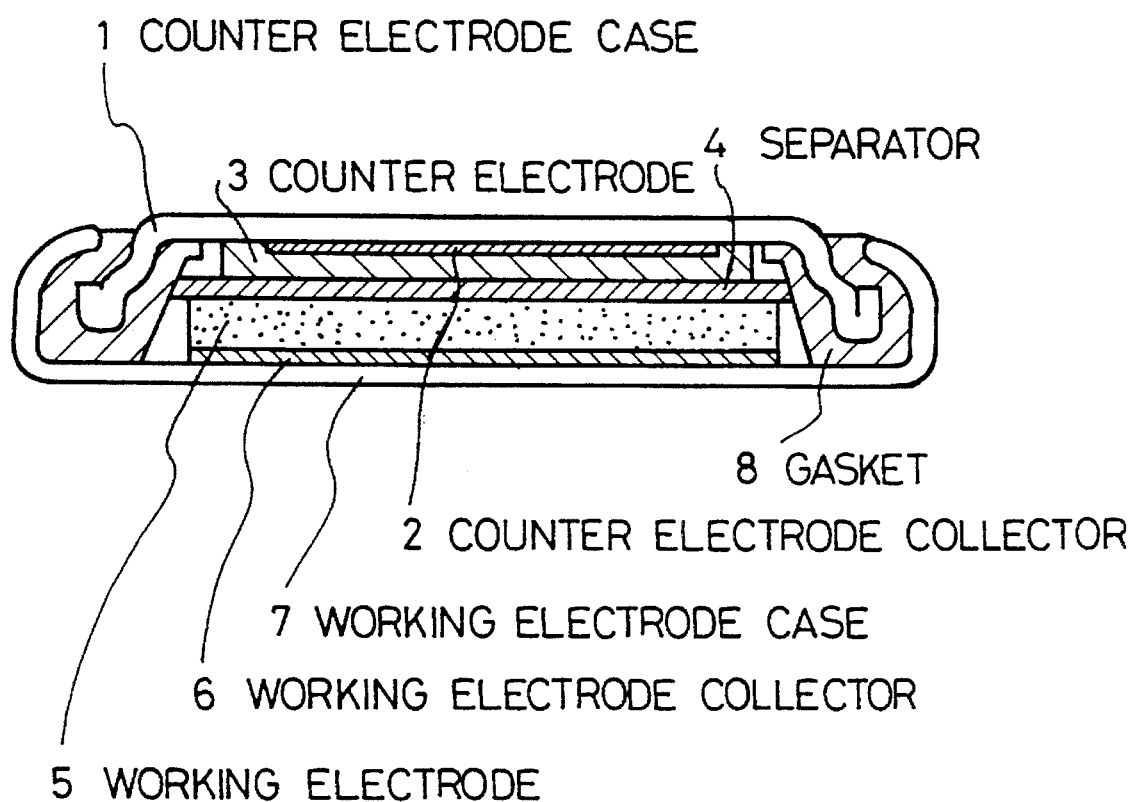
FIG. 1 is an illustrative view showing one example of a test cell used for performance evaluation of a negative active material.

FIG. 1 is a sectional view of a coin type test cell showing one example of a test cell used for evaluating a performance of a negative active material of a non-aqueous electrolyte secondary cell according to the present invention. In the drawing, numeral 1 depicts a counter electrode case simultaneously used as a counter electrode terminal and comprised of a plate made of stainless steel whose outer side surface is Ni-plated. 2 depicts a counter electrode collector formed of net made of the stainless steel and spot-welded to the counter electrode case 1. A counter electrode 3 is produced in which predetermined thickness of aluminum plate is punched with a diameter of 15 mm and fixed on the counter electrode collector 2, and the resultant is press-fitted thereon with lithium foil having a predetermined thickness punched into a diameter of 14 mm. 7 depicts a working electrode case made of stainless steel whose outer side surface is Ni-plated, and which is also used as a working electrode terminal. 5 depicts a working electrode formed of an active material according to the invention described later or of the comparison active material by the conventional method. 6 depicts a working electrode collector made of conductive adhesive agent using carbon as a conductive filler, and is electrically connected with the working electrode 5 and the working electrode case 7 each of which is adhered together. 4 depicts a separator made of porous film of polypropylene and is impregnated with an electrolyte solution. 8 depicts a gasket mainly made of polypropylene, which is placed between the counter electrode case 1 and the working electrode case 7, maintaining insulation between the counter electrode and the working electrode. The cell contents are sealed by means of the working electrode case opening edge being bent and caulked inside. An electrolyte is produced in which one mol/l of lithium perchrorate $LiClO_4$ is dissolved into a mixture solvent of volume ratio of 1:1:2 of propylenecarbonate, ethylenecarbonate and 1,2-dimethoxyethane. The cell has an outer diameter of 20 mm with a thickness of 1.6 mm.

EMBODIMENT 1

The active material used for the working electrode 5 is produced using composite oxide of silicon shown by the composition formula $Si_{1-y}M_yO_z$ (0<y<1, 0<z<2) whose element(s) M are tungsten W, tin Sn, lead Pb and boron B, as described below. Tungsten dioxide ($WO_2$), tin monoxide (SnO), lead monoxide (PbO) or boron oxide ($B_2O_3$) obtained in the market and silicon monoxide (SiO) also obtained in the market are weighed for a number ratio of element M atom and silicon Si atom, 1:9 (corresponding to y=0.1) respectively and sufficiently ground and mixed in a mortar. These four mixtures of SiO and each of four compounds are thermal-treated in a nitrogen atmosphere at a temperature of 700° C. in 12 hours, obtaining four kinds of composite oxides shown by the formula $Si_{0.9}M_{0.1}O_z$ (M=W, Sn, Pb, B). After cooling the resultants are ground and formed into a diameter equal to or less than 53 μm in the mortar, and used as an active material of the working electrode. Assuming respectively the active materials "a" ($Si_{0.9}W_{0.1}O_{1.1}$), "b" ($Si_{0.9}Sn_{0.1}O_{1.0}$), "c" ($Si_{0.9}Pb_{0.1}O_{1.0}$), and "d" ($Si_{0.9}B_{0.1}O_{1.05}$), these four kinds of active materials are added with graphite as a conductive agent, and a cross-linked type acrylic acid resin as a binding agent and the like respectively at a mixture weight ratio of 65:20:15 to produce a working electrode mixture. Next, this working electrode mixture is press-molded into a pellet having a diameter of 15 mm with a thickness of 0.3 mm by 2 ton/cm² to produce the working electrode 5. Thereafter, the obtained working electrode 5 is adhered on the working electrode case 7 using the working electrode collector 6 made of conductive resin adhesive agent using carbon as a conductive filler, to form a unitary body, and vacuum-heated and dried at 200° C. for 10 hours. The resultant is used to produce the coin type test cell described above.

The 4 kinds of test cells produced are aged for one week at room temperature. During this aging, lithium-aluminum laminated electrode as the counter electrode is allowed to contact with the non-aqueous electrolyte solution within the cells to enable alloying sufficiently, whereby this substantially allows the entire lithium foil to become Li-Al alloy. Consequently, the cell voltage is reduced by about 0.4 V to become stable as compared to using metal lithium in a simple substance as a counter electrode. The produced test cells are made respectively as test cells A, B, C, and D corresponding to active materials "a", "b", "c" and "d".

Figure 2:
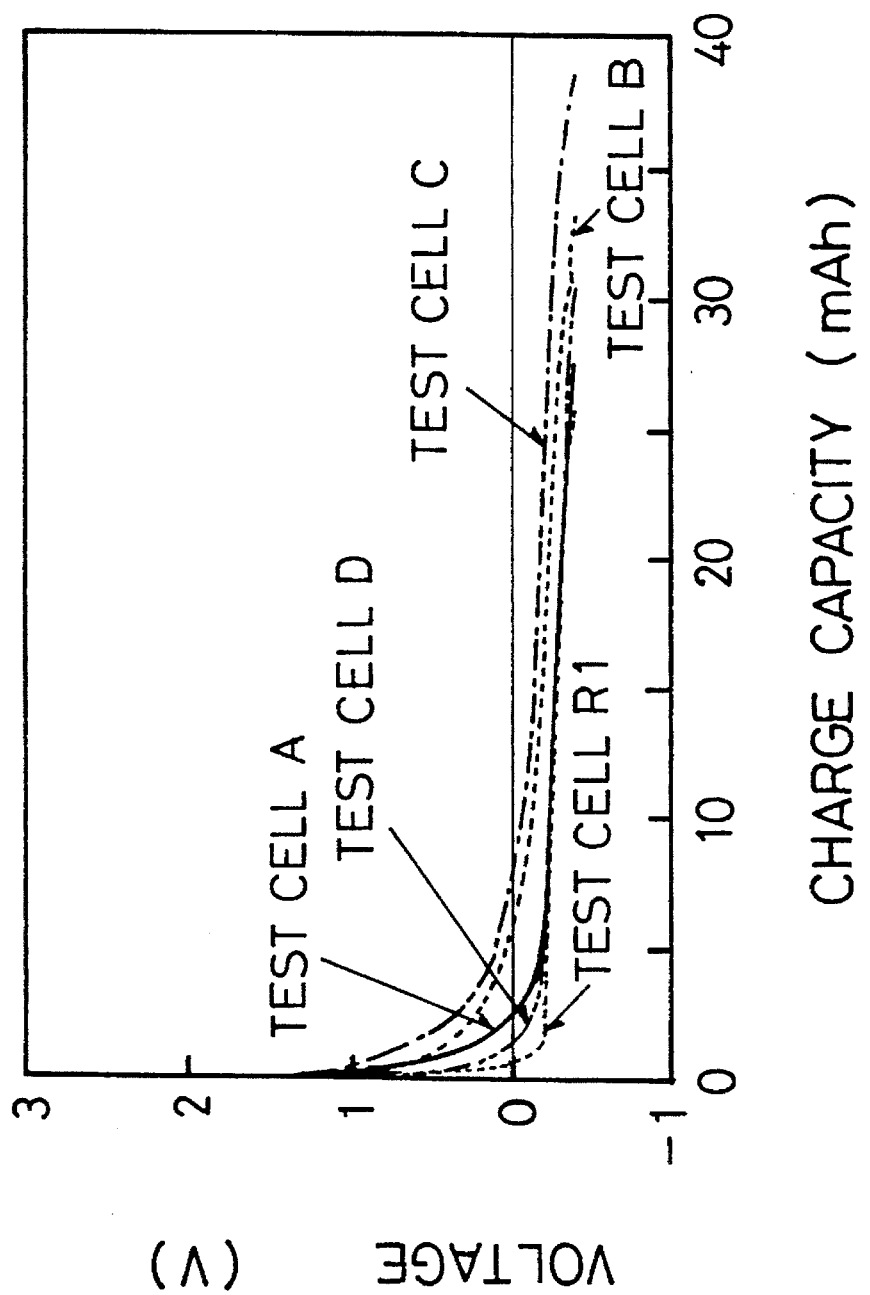
FIG. 2 is a graphical representation showing a comparison of a charge characteristic on the third cycle between a negative active material for a test cell according to the invention and a conventional cell.
Figure 3:
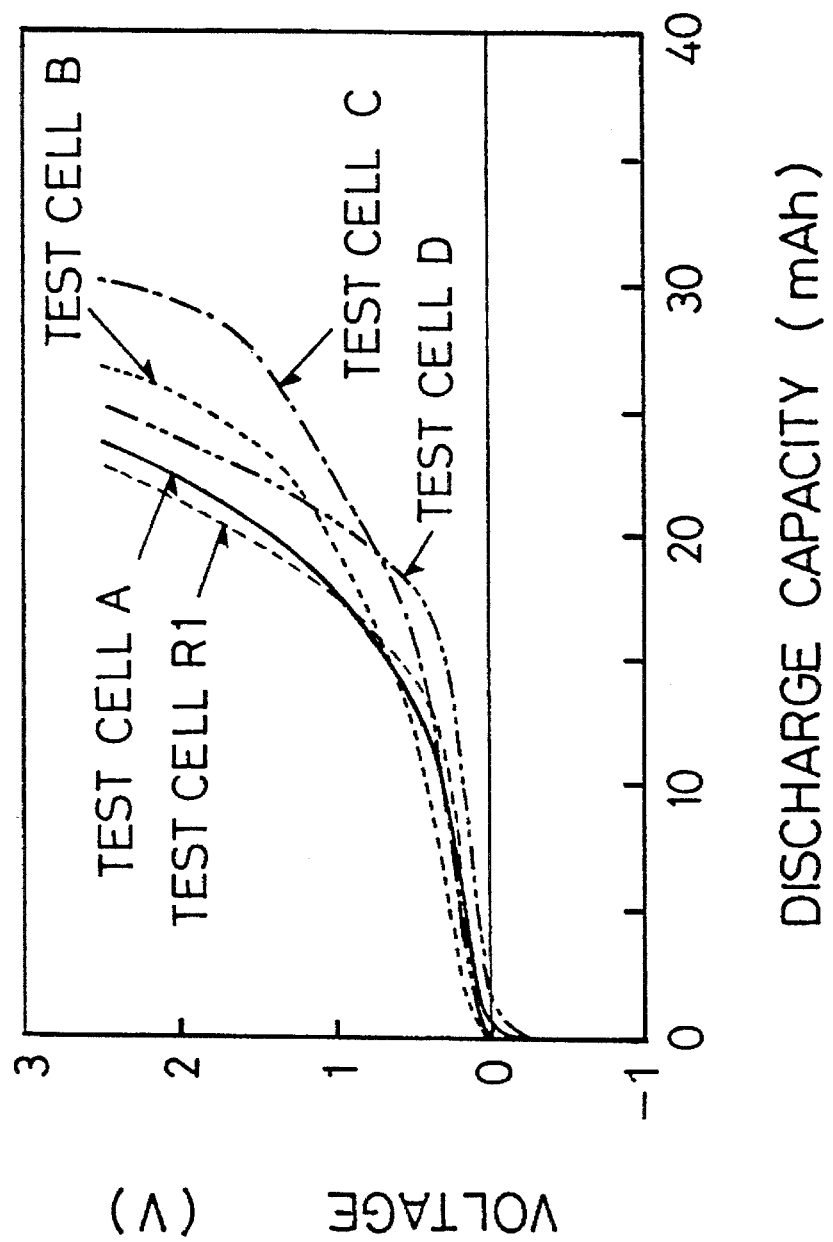
FIG. 3 is a graphical representation showing a comparison of a discharge characteristic on the third cycle between a negative active material for a test cell according to the invention and a conventional cell.

The cells A, B, C and D thus produced are tested of charge and discharge, as follows. A charging and discharging cycle test is performed under the condition of a constant current of 1 mA with a final voltage of −0.4 V of charging (a current direction for cell reaction where lithium ions are incorporated into the working electrode from the electrolyte solution) and a final voltage of 2.5 V of discharging (a current direction of cell reaction where lithium ions are released into the electrolyte solution from the working electrode). A charge characteristic and a discharge characteristic each on the third cycle are shown in FIGS. 2 and 3 respectively. A rate of discharge capacity loss to charge capacity of the first cycle of the test cell B ((charge capacity-discharge capacity)/charge capacity) is shown in Table 1, where the charge and discharge cycle is started from charging.

In such charge and discharge cycle, lithium ions are released from Li-Al alloy of the counter electrode into the electrolyte solution by charging, and the lithium ions move in the electrolyte solution to electrode-react with the active material $Si_{1-y}M_yO_z$ of the working electrode, thereby the lithium ions are electrochemically incorporated into the active material $Si_{1-y}M_yO_z$ to produce a composite oxide $LixSi_{1-y}M_yO_z$ of silicon and the element(s) M containing lithium. Next on discharge, the lithium ions are released into the electrolyte solution from the composite oxide $Li_xSi_{1-y}M_yO_z$ to move in the electrolyte solution and to be incorporated into the counter electrode Li-Al alloy, this consequently enables a repeated stable charge and discharge. Here, the active material $Si_{1-y}M_yO_z$, after producing $Li_xSi_{1-y}M_yO_z$ of silicon and element(s) M containing lithium by the first charge, forms composite oxide $Li_xSi_{1-y}M_yO_z$ of silicon and element(s) M containing lithium on thereafter discharge-charge cycle other than when completely discharged.

COMPARISON EXAMPLE

In comparison, with exception of using silicon monoxide SiO (hereinafter referred to simply as "active material r1") obtained in the market as an active material of a working electrode, instead of the active materials "a" to "d" according to the invention described, the same test cell R1 as said (Embodiment 1) is produced. For this test cell R1, the same test of charge and discharge as above is performed, where a charge characteristic and a discharge characteristic each on the third cycle are shown in FIGS. 2 and 3 respectively, and a rate of discharge capacity loss for charge capacity of the first cycle is shown in Table 1.

TABLE 1

| Cell | a rate of discharge capacity loss for charge capacity of the first cycle |
|---|---|
| Cell B | 30.7% |
| Cell R1 | 54.0% |

As is apparent from FIGS. 2 and 3, it is found that the test cells A to D using the working electrode using as an active material the composite oxide shown by formula $Li_xSi_{1-y}M_yO_z(0 \leq x)$ and where silicon and element(s) M coexist, have a considerably larger charge and discharge capacity compared to the test cell R1 using oxide $Li_xSiO_z$ of only silicon in y=0 as an acting material. In particular, it is found to have a considerably larger charge and discharge capacity of a base potential region of −0.4 to +0.6 V for the counter electrode being Li-Al alloy electrode (corresponding to about 0 to 1 V for metal lithium), therefore exhibiting particularly upgraded property as a negative active material of the non-aqueous electrolyte secondary battery. In Table 1, it is found that, in case of using as an active material the composite oxide where silicon and element(s) M coexist, a discharge capacity loss is considerably smaller compared to the case of using the oxide $SiO_z$ of only silicon as an active material. Further, not shown in the drawing, the test cell using composite oxide $Li_xSi_{1-y}M_yO_z$ as an active material has a stabler cycle characteristic with less lowering of charge and discharge capacity due to repeated charge and discharge, compared to the test cell using $Li_xSiO_z$ as an active material.

EMBODIMENT 2

In the present embodiment, instead of the active materials "a" to "d" of the working electrode of the embodiment 1, the active materials synthesized as described below are used and the same entire test cells as in the embodiment 1 are produced with exception of the active material of the working electrode.

The active materials of the working electrode are produced as follows. Silicon monoxide (SiO) and manganese monoxide (MnO) each obtained in the market are weighed at a mol ratio of Si:Mn of 1:1, and sufficiently mixed in a mortar. Thereafter the mixture is heated and burned for 12 hours at a temperature of 700° C. in a nitrogen atmosphere, cooled, an then ground and graded into a diameter equal to or less than 53 μm to produce an active material "e" having formula $Si_{0.5}Mn_{0.5}O$ according to the invention.

In comparison, instead of the active material "e" according to the invention described, this embodiment uses the same graphite (hereinafter referred to simply as "comparison active material r4") as used for conductive agent in the embodiment 1 and uses the active material in which silicon monoxide SiO (the formerly described active material r1) and manganese monoxide (referred to simply as "comparison active material r2") each obtained in the market are ground and graded into a diameter equal to or less than 53 μm respectively and used as an active material, and with exception of the above, the same test cell (comparison test cell) as is the case of the cell in the present invention is produced.

The test cells thus produced are referred to simply as test cells E, R1, R2, and R4 corresponding to active materials "e", r1, r2, and r4 of the working electrode.

Figure 4:
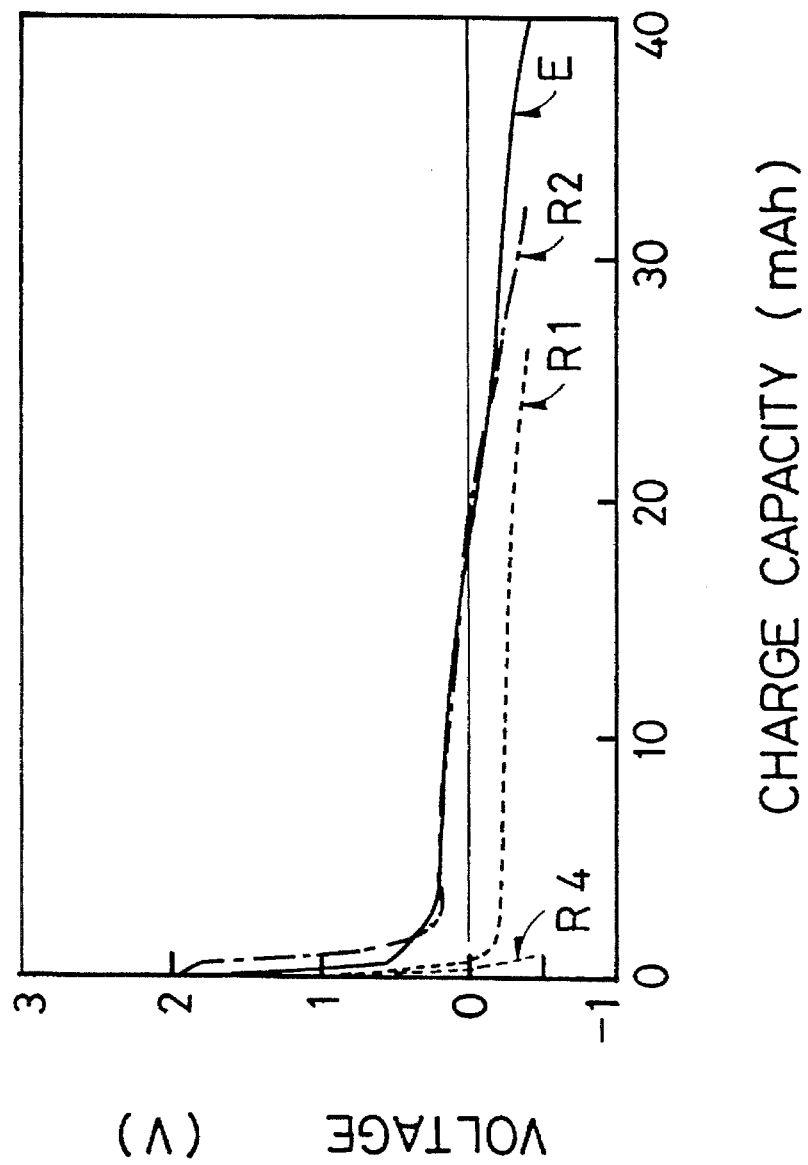
FIG. 4 is a graphical representation showing a comparison of a charge characteristic on the third cycle between negative active material for a test cell according to the invention and a conventional cell.
Figure 5:
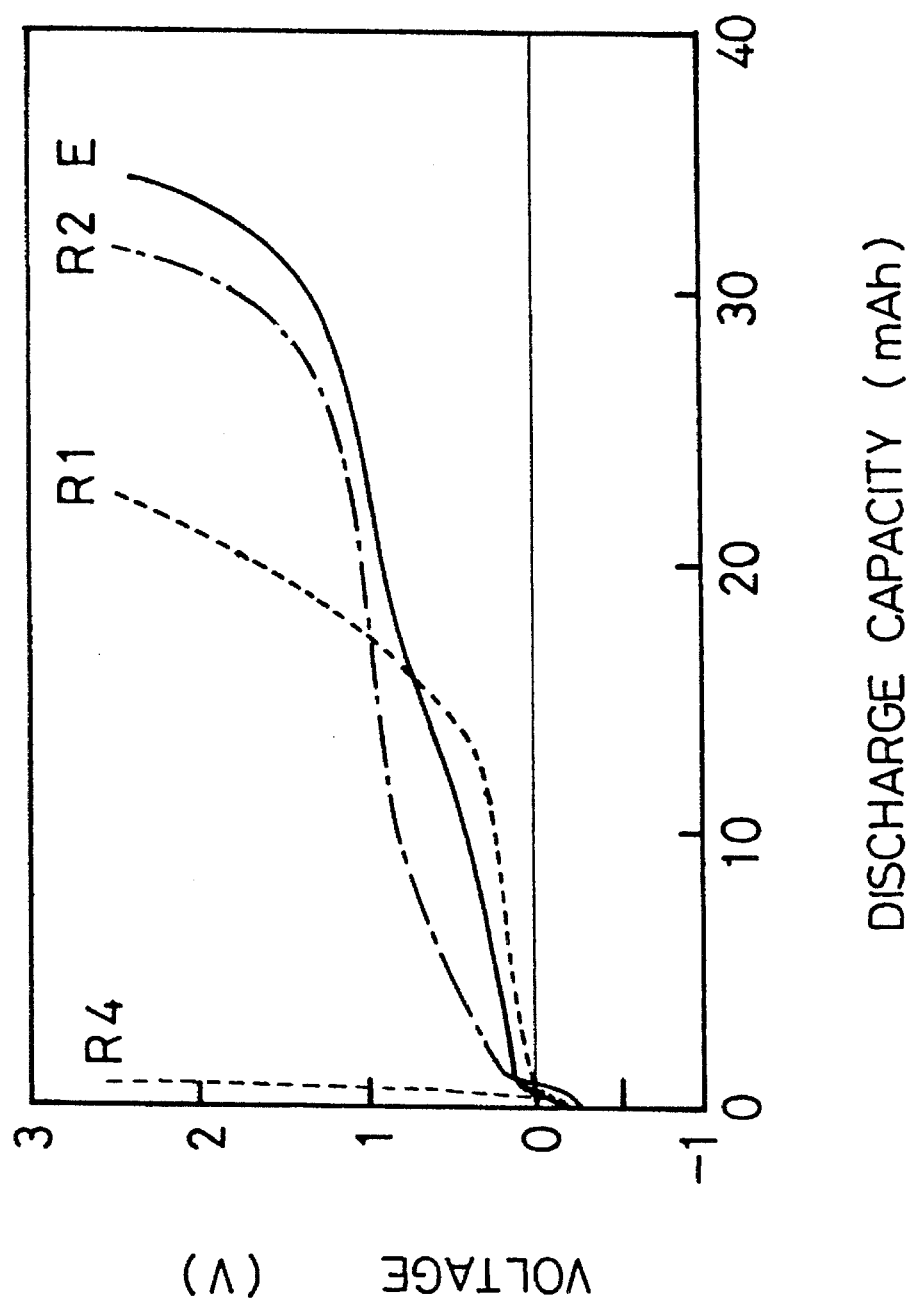
FIG. 5 is a graphical representation showing a comparison of a discharge characteristic on the third cycle of a negative active material between test cell according to the invention and a conventional cell.

A charge characteristic and discharge characteristic each on the third cycle when performing charge and discharge cycle for the test cells E, R1, R2, and R4 under the same condition as in the embodiment 1, are shown in FIGS. 4 and 5. As is apparent from FIGS. 4 and 5, it is found that the test cell E according to the invention has considerably larger charge and discharge capacities with an extreme enlargement of the reversible region of charge and discharge compared to the comparison test cells R1 and R4. Further, a difference between operating voltages of charge and discharge is considerably smaller ranging the entire charge and discharge region, and this produces extremely smaller cell polarization (internal resistance) to facilitate larger current charge and discharge.

It is found that the test cell R2 has the same extent of charge and discharge capacity as the test cell E, but, the operating potential of charge and discharge is high (noble). In the test cell E of this invention, the charge and discharge capacity of base potential region of less than 1.1 V (corresponding to about 1.5 V for the lithium standard electrode) is considerably higher than the test cell R2, and the active material E according to the invention is found particularly superior as a negative active material.

EMBODIMENT 3

In the present embodiment, an active material synthesized as described below is used instead of the active materials "a" to "d" of the working electrode of the embodiment 1, thus, entirely the same test cell as in the embodiment 1 is produced with exception of the active material of the working electrode.

An active material for the working electrode of the present embodiment is produced as follows. Silicon monoxide SiO and titanium monoxide TiO each obtained in the market are weighed for a predetermined mol ratio of Si:Ti and thereafter fully ground and mixed by an automatic mortar. The mixture is then thermal-treated for 12 hours at a temperature of 700° C. in a nitrogen gas atmosphere, cooled, and ground and graded into a particle diameter equal to or less than 53 μm. In this way, the produced $(Si_{1-y}Ti_yO)$ is used as an active material according to the present invention.

In this embodiment, three kinds of active materials of the working electrode having a mol ratio of Si:Ti are produced for comparison as follows, namely, (f1) 3:1 $(Si_{0.75}T_{0.25}O)$, (f2) 1:1 $(Si_{0.5}Ti_{0.5}O)$, and (f3) 1:3 $(Si_{0.25}Ti_{0.75}O)$.

For comparison, instead of the active materials f1 to f3 according to the invention described, this embodiment uses as comparison active materials r1 and r3 the silicon monoxide SiO and titanium monoxide TiO respectively ground and graded into a particle diameter equal to or less than 53 μm the same as used in the synthesis material described above. With exception of the above, the similar test cells (comparison cells) are produced in the same way as in the test cell according to the present invention described above.

Thus produced test cells are referred to simply as test cells F1, F2, F3, R1 and R3 corresponding to active materials f1, f2, f3, r1 and r3 of the working electrode respectively used.

Figure 6:
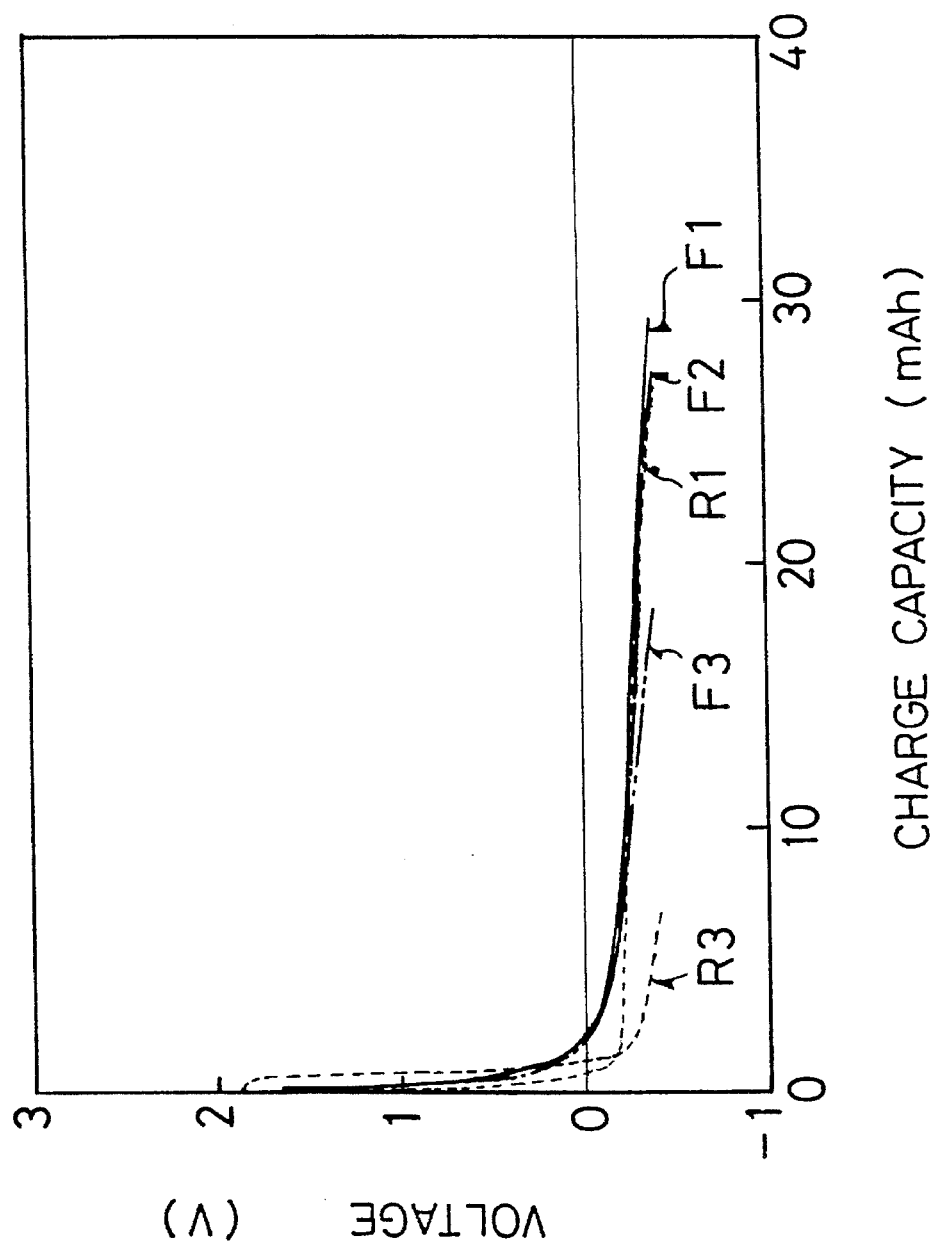
FIG. 6 is a graphical representation showing a comparison of a charge characteristic on the third cycle of a negative active material between a test cell according to the invention and a conventional cell.
Figure 7:
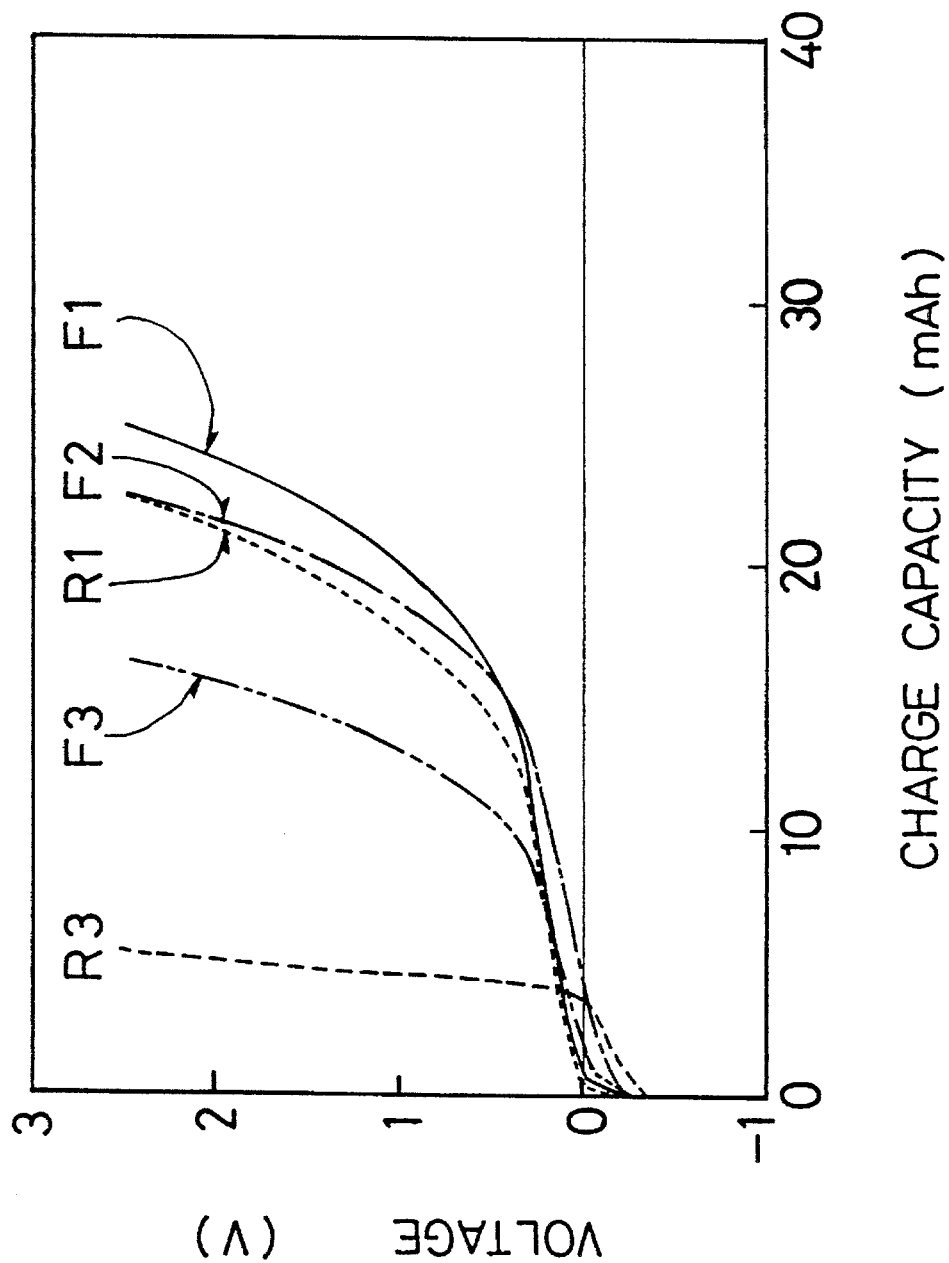
FIG. 7 is a graphical representation showing a comparison of a discharge characteristic on the third cycle of a negative active material between a test cell according to the invention and a conventional cell.

A charge characteristic and discharge characteristic each on the third cycle when performing the charge and discharge cycle test for the test cells F1 to F3 and R1 to R3 under the same condition as in the embodiments 1 and 2, are shown in FIGS. 6 and 7 respectively.

As is apparent from FIGS. 6 and 7, it is found that the test cell F1 (titanium amount y=0.25) and the test cell F2 (y=0.5), which utilize the working electrode using as an active material the composite oxide shown by formula $Li_xSi_{1-y}Ti_yO_z$ and where silicon and titanium co-exist, are capable of enlarging reversible regions of charge and discharge with larger charge and discharge capacity, compared to the test cells R1 and R3 using silicon oxide $Li_xSiO_z$ and titanium oxide $Li_xTiO_z$. Also, it is found that a difference between operating voltages of charge and discharge is considerably smaller ranging the entire charge and discharge region, and this extremely reduces polarization (internal resistance) of the test cell to facilitate larger current charge and discharge. In particular, it is found that, since the charge and discharge capacity is considerably larger in a base potential region such as in −0.4 to +0.6 V for the counter electrode of Li-Al alloy electrode (corresponding to about 0 to 1 V for metal lithium), then it has a superior property as a negative active material of the non-aqueous electrolyte secondary battery. On the other hand, in a test cell A3 of titanium amount y=0.75, a charge and discharge capacity is smaller than in the test cell R1 using silicon oxide $Li_xSiO_z$, however, it is superior as a negative active material because of its lower (base) operating voltage of discharge. A relatively smaller difference between operating voltages of charge and discharge provides a smaller polarization, and results in an upgraded larger current charge and discharge characteristic.

As a result, in such a composite oxide $Li_xSi_{1-y}Ti_yO_z$ of silicon and titanium containing lithium, the charge and discharge characteristic is upgraded in the case of the range 0<y< 1 as titanium amount "y" and this range may be satisfied, and preferably 0<y<0.75, and more preferably the larger current charge and discharge characteristic in the case of $0 < y \leq 0.5$ is fully upgraded together with larger charge and discharge capacity, therefore, such range is particularly preferable.

The novel negative active material $Li_xSi_{1-y}Ti_yO_z$ as the composite oxide according to the invention, where silicon and titanium coexist as described above, facilitates the incorporation and release of lithium ions because of a higher mobility of lithium ions, higher electron conductivity and the large amount of sites capable of incorporating lithium ions.

EMBODIMENT 4

Figure 8:
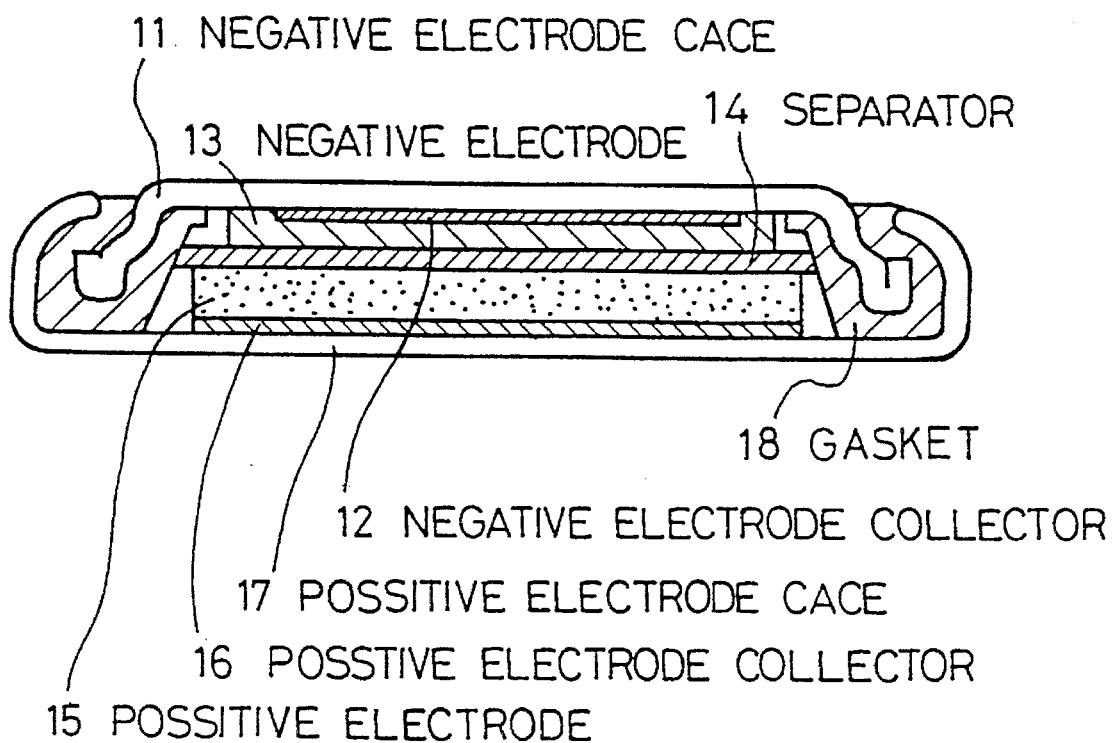
FIG. 8 is an illustrative view showing one example of a battery embodying the present invention.

FIG. 8 is a sectional view of a coin type battery showing one example of a non-aqueous electrolyte secondary battery according to the invention. In the drawing, 11 depicts a negative electrode case simultaneously used as a negative electrode terminal, where a stainless steel plate whose outer side surface is Ni-plated. Numeral 13 depicts a negative electrode formed of a negative active material according to the invention described later and adhered to the negative electrode case 11 by a negative electrode collector 12 formed of a conductive adhesive agent using carbon as a conductive filler. 17 depicts a positive electrode case made of stainless steel whose outer side surface is Ni-plated, and the case is used simultaneously as a positive electrode terminal. 15 depicts a positive electrode formed of a positive active material according to the invention described later, and is adhered to the positive electrode case 17 by a positive electrode collector 16 made of conductive adhesive agent using carbon as conductive filler. 14 depicts a separator made of porous film of polypropylene and is impregnated with an electrolyte solution. 18 depicts a gasket mainly made of polypropylene, and is placed between the negative electrode case 11 and the positive electrode case 17, maintaining electric insulation between the negative electrode and the positive electrode, and sealing the cell content by allowing the positive electrode case opening edge to be bent and caulked inside. The electrolyte solution used is one in which lithium hexafluorophosphate LiPF6 of 1 mol/l is dissolved into mixed solvent of ethylene carbonate and methyl-ethyl-carbonate of volume ratio of 1:1. The cell has an outer diameter of 20 mm with a thickness 1.6 mm.

The negative electrode 13 is produced as follows. The active material "a" $(Si_{0.9}W_{0.1}O_{1.1})$ produced in the embodiment 1 is used as a negative active material of the present embodiment according to the present invention. In comparison, silicon monoxide SiO (comparison active material r1) used as the comparison example of the embodiment 1 is used as a negative active material for comparison. These negative active materials "a" and r1 are mixed with graphite as a conductive agent and with cross-linked type acrylic acid resin and the like as a binder at a mixture rate of weight ratio of 45:40:15 respectively, to produce negative electrode mixtures, and next these negative electrode mixtures are pressed to form pellets having a diameter of 15 mm with a thickness of 0.14 mm by adding 2 ton/cm$^2$, and thereafter the resultants are depressurized and thermal-dried for 10 hour at 200° C. to produce a negative electrode.

The positive electrode 15 is produced as follows. Lithium hydroxide LiOH.H$_2$O, cobalt carbonate CoCO$_3$ and boron oxide B$_2$O$_3$ are weighed for a mol ratio of Li:Co:B of 1:0.9:0.1, and fully mixed in a mortar. Thereafter the mixture obtained is heated and baked for 12 hour at a temperature of 850° C. in air, cooled, and the resultant is ground to form into a particle diameter equal to or less than 53 μm. The heating and grinding are repeated two times to synthesize the positive active material LiCo$_{0.9}$B$_{0.1}$O$_2$, of the present embodiment.

This product is used as a positive active material, and added with graphite as a conductive agent and fluororesin and the like as a binder at a weight ratio of 80:15:5 to be mixed and to produce a positive electrode mixture. Next, this positive electrode mixture is formed into a pellet having a diameter of 16.2 mm with a thickness of 0.70 mm by 2 ton/cm$^2$ and thereafter depressurized and thermal-dried for 10 hours at 100° C. to produce a positive electrode.

The produced batteries (these correspond to negative active materials "a" and r1 respectively used and are made as batteries G and S) remain aged for one week at room temperature and then are subjected to a charge and discharge test as described below.

Figure 9:
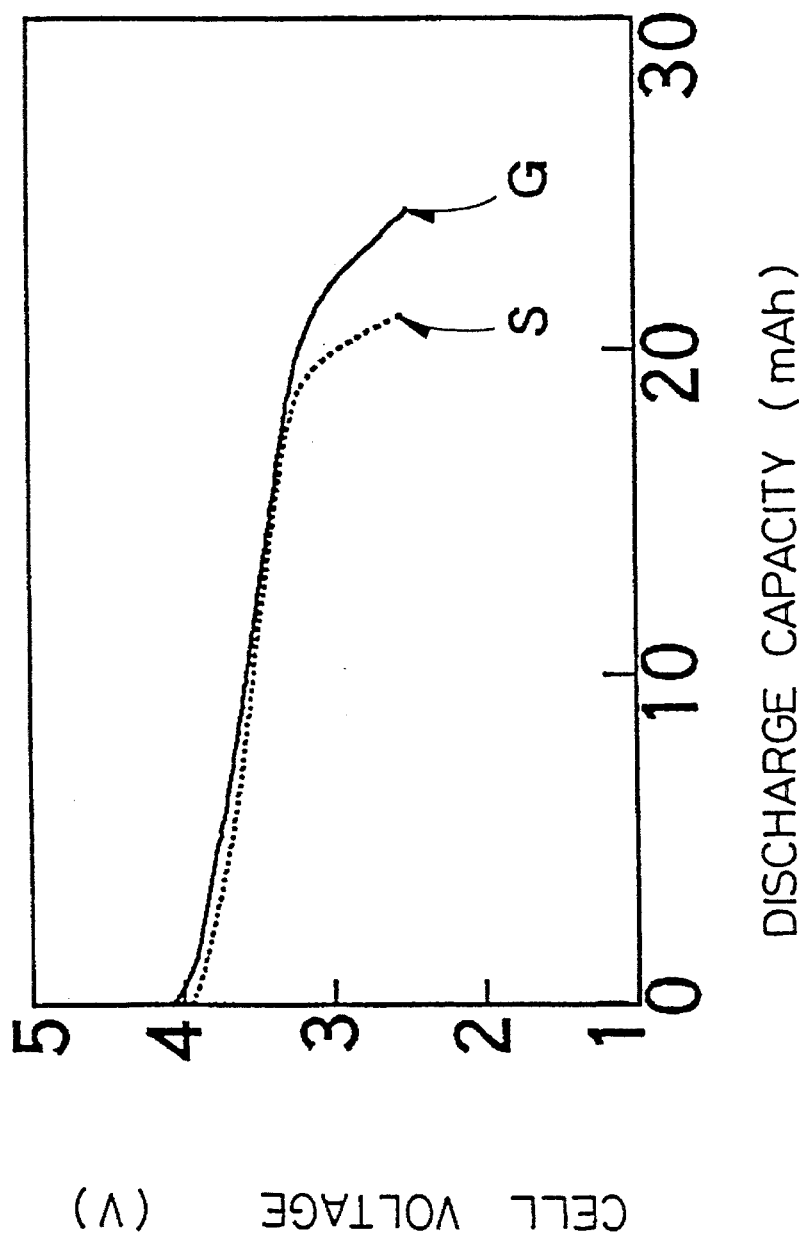
FIG. 9 is a graphical representation showing a comparison of a discharge characteristic on second cycle between a battery according to a invention and the conventional battery.

A discharge characteristic on the second cycle when performing a charge and discharge cycle for the batteries G and S under the condition of a constant current of 1 mA, a final charge voltage 4.2 V, and a final discharge voltage 2.5 V, is shown in FIG. 9. The charge and discharge cycle starts from charge.

In the battery G, lithium ions are released into the electrolyte solution from the positive active material LiCo$_{0.9}$B$_{0.1}$O$_2$ by charging, the resulting lithium ions are moved in the electrolyte solution to electrode-react with the negative active material, and the lithium ions are electrochemically incorporated into the negative active material to produce composite oxide Li$_x$Si$_{0.9}$W$_{0.1}$O$_{1.1}$ of silicon and an element M (tungsten W) containing lithium. Thereafter, on discharging, lithium ions are released into the electrolyte solution from the composite oxide of silicon and the element M containing lithium to move in the electrolyte solution and to be incorporated into the positive active material, thereby the charge and discharge is stably repeated. The negative active material, after producing the composite oxide Li$_x$Si$_{0.9}$W$_{0.1}$O$_{1.1}$ containing lithium by the first charge, forms composite oxide Li$_x$Si$_{0.9}$W$_{0.1}$O$_{1.1}$ of silicon and the element M containing lithium on thereafter discharge-charge cycle other than when completely discharged.

As is apparent from FIG. 9, it is found that the battery G according to the invention has a larger discharge capacity and higher operating voltage as compared to the comparison battery S, providing an upgraded charge and discharge characteristic. Also, it was found that, when this charge and discharge was performed up to 20 cycles, then in the comparison battery S, the discharge capacity was lowered to about 90% of an initial capacity, while in the battery G, the capacity was hardly lowered, a cycle service life was considerably improved.

In the embodiments, only the cases of lithium-aluminum alloy and Li$_x$Co$_{0.9}$B$_{0.1}$O$_2$ are shown as a counter electrode. However, it is understood that the present invention is not limited to the embodiments. As formerly described, it is of course that the negative electrode using the negative active material according to the invention is used through combining it with the positive electrode being the counter electrode utilizing as an active material the materials capable of incorporating and releasing lithium cation and/or anion; metal chalcogenide such as TiS$_2$, MoS$_2$, and NbSe$_3$; metal oxide such as MnO$_2$, MoO$_3$, V$_2$O$_5$, Li$_x$CoO$_2$, Li$_x$NiO$_2$, and Li$_x$Mn$_2$O$_4$; conductive polymer such as polyanilin, polypyrrole, polyparaphenylene, and polyacene; and graphite intercalation compounds and the like.

As hereinbefore fully described, the present invention as a negative acting material of a non-aqueous electrolyte secondary battery, is shown by a composition formula Li$_x$Si$_{1-y}$M$_y$O$_z$ (where 0<x, 0<y<1, and 0<z<2 are established), and uses a novel acting material formed of composite oxide which is, containing lithium, composed of metal other than alkaline metals or metalloid M other than silicon and silicon, where, in a base potential region of 0 to 1 V for a standard lithium electrode (metal lithium), an amount capable of reversibly incorporating and releasing lithium ions by charge and discharge, namely, the charge and discharge capacity, is considerably larger together with smaller polarization of the charge and discharge. A secondary battery is therefore produced having an upgraded charge and discharge characteristic in larger current with a high voltage, high energy density. In addition, an extremely stable secondary battery with a long cycle service life can be produced almost without deterioration, such as generation of irreversible substances due to over charge and over discharge.

What is claimed is:

1. A non-aqueous electrolyte secondary battery comprising: a negative electrode; a positive electrode; and a non-aqueous electrolyte with lithium ion conductivity; wherein the negative electrode has an active material comprised of a composite oxide represented by composition formula Li$_x$Si$_{1-y}$O$_z$, where M is one or more kinds of elements selected from metals other than alkaline metals, and metalloids other than silicon, and x, y and z satisfy $0 \leq x$, $0<y<1$, and $0<z<2$.

2. A non-aqueous electrolyte secondary battery as claimed in claim 1; wherein the amount z of oxygen of said composite oxide Li$_x$Si$_{1-y}$O$_z$ satisfies $0<z \leq 1.5$.

3. A non-aqueous electrolyte secondary battery as claimed in claim 2; wherein the amount y of M of said composite oxide Li$_x$Si$_{1-y}$O$_z$ satisfies $0<y<0.75$.

4. A non-aqueous electrolyte secondary battery as claimed in claim 1; wherein the amount y of M of said composite oxide Li$_x$Si$_{1-y}$M$_y$O$_z$ satisfies $0<y<0.75$.

5. A non-aqueous electrolyte secondary battery comprising: a negative electrode; a positive electrode; and a non-aqueous electrolyte with lithium ion conductivity; wherein the negative electrode has an active material comprised of a composite oxide represented by composition formula Li$_x$Si$_{1-y}$M$_y$O$_z$, where M is one kind or more kinds of elements selected from transition metals, and metals and metalloids selected from Groups IIIA and IVA of the periodic table.

6. A non-aqueous electrolyte secondary battery as claimed in claim 5; wherein the amount z of oxygen of said composite oxide Li$_x$Si$_{1-y}$M$_y$O$_z$ satisfies $0<z \leq 1.5$.

7. A non-aqueous electrolyte secondary battery as claimed in claim 5; wherein the amount y of M of said composite oxide Li$_x$Si$_{1-y}$M$_y$O$_z$ satisfies $0<y<0.75$.

8. A non-aqueous electrolyte secondary battery comprising: a negative electrode; a positive electrode; and a non-aqueous electrolyte with lithium ion conductivity; wherein the negative electrode has an active material comprised of a composite oxide represented by composition formula $Li_xSi_{1-y}M_yO_z$, where M is one kind or more kinds of metals or metalloids selected from the group consisting of titanium, tungsten, manganese, iron, nickel, boron, tin and lead.

9. A non-aqueous electrolyte secondary battery as claimed in claim 8; wherein the amount z of oxygen of said composite oxide $Li_xSi_{1-y}M_yO_z$ satisfies $0<z\leqq 1.5$.

10. A non-aqueous electrolyte secondary battery as claimed in claim 8; wherein the amount y of M of said composite oxide $Li_xSi_{1-y}M_yO_z$ satisfies $0<y<0.75$.

11. A non-aqueous electrolyte secondary battery comprising: a negative electrode; a positive electrode; and a non-aqueous electrolyte with lithium ion conductivity; wherein the negative electrode has an active material comprised of a composite oxide represented by composition formula $Li_xSi_{1-y}M_yO_z$, where M is one or more kinds of elements selected from metals other than alkaline metals, and metalloids other than silicon, and x, y and z satisfy $0\leqq x$, $0<y<1$, and $0<z<2$; and wherein the positive electrode has an active material comprised of a composite oxide represented by composition formula $Li_aT_bL_cO_2$ and has a layer-like structure, where T is one kind or more kinds of transitional metal elements, L is one or more kinds of metalloid elements selected from boron and silicon, and a, b, c satisfy $0<a\leqq 1.15$, $0.85\leqq b+c\leqq 1.3$, and $0\leqq c$.

12. A non-aqueous electrolyte secondary battery as claimed in claim 11; wherein the amount z of oxygen of said composite oxide $Li_xSi_{1-y}M_yO_z$ satisfies $0<z\leqq 1.5$.

13. A non-aqueous electrolyte secondary battery as claimed in claim 11; wherein the amount y of M of said composite oxide $Li_xSi_{1-y}M_yO_z$ satisfies $0<y<0.75$.

14. A non-aqueous electrolyte secondary battery as claimed in claim 11; wherein the non-aqueous electrolyte comprises at least a non-aqueous solvent containing ethylene carbonate and a supporting electrolyte containing lithium ions.

15. A non-aqueous electrolyte secondary battery as claimed in claim 14; wherein the non-aqueous electrolyte further comprises an R.R' type alkyl carbonate represented by a formula,

 (formula 1)

where R and R' are alkyl groups indicated as $C_nH_{2n+1}$ in formula 1.

16. A non-aqueous electrolyte secondary battery as claimed in claim 15; wherein the R.R' type alkyl carbonate is dimethyl carbonate, diethyl carbonate or methyl-ethyl carbonate.

17. A non-aqueous electrolyte secondary battery comprising: positive and negative electrodes separated by a non-aqueous electrolyte capable of conducting lithium ions, the negative electrode having an active material comprised of a composite oxide $Li_xSi_{1-y}M_yO_z$, where M is one or more kinds of elements selected from metals other than alkaline metals, and metalloids other than silicon, and x, y, and z satisfy $0\leqq x$, $0<y<1$, and $0<z<2$.

18. A non-aqueous electrolyte secondary battery as claimed in claim 17; wherein the positive electrode has an active material comprised of a composite oxide represented by composition formula $Li_aT_bL_cO_2$ where T is one kind or more kinds of transitional metal elements, L is one or more kinds of metalloid elements selected from boron and silicon, and a, b, c satisfy $0<a\leqq 1.15$, $0.85\leqq b+c\leqq 1.3$, and $0\leqq c$.

19. A non-aqueous electrolyte secondary battery as claimed in claim 18; wherein the positive electrode has a layered structure.

20. A non-aqueous electrolyte secondary battery as claimed in claim 18; wherein the amount z of oxygen of said composite oxide $Li_xSi_{1-y}M_yO_z$ satisfies $0<z\leqq 1.5$.

21. A non-aqueous electrolyte secondary battery as claimed in claim 18; wherein the amount y of M of said composite oxide $Li_xSi_{1-y}M_yO_z$ satisfies $0<y<0.75$.

22. A non-aqueous electrolyte secondary battery as claimed in claim 18; wherein the non-aqueous electrolyte comprises an R.R' type alkyl carbonate represented by a formula,

 (formula 1)

where R and R' are alkyl groups indicated as $C_nH_{2n+1}$ in formula 1.

23. A method of producing a non-aqueous electrolyte secondary battery having a negative electrode, a positive electrode and a non-aqueous electrolyte with lithium ion conductivity, the method comprising: incorporating lithium ion into a composite oxide $Si_{1-y}M_yO_z$ of silicon and element M by electrochemical reaction; and producing a composite oxide $Li_xSi_{1-y}M_yO_z$ containing lithium inside the battery after assembly of the battery, or inside or outside the battery during production of the battery.

24. A non-aqueous electrolyte secondary battery as claimed in claim 1; wherein the non-aqueous electrolyte comprises at least a non-aqueous solvent containing ethylene carbonate and a supporting electrolyte containing lithium ions.

\* \* \* \* \*

UNITED STATES PATENT AND TRADEMARK OFFICE
CERTIFICATE OF CORRECTION

PATENT NO. : 5,506,075
DATED : April 9, 1996
INVENTOR(S) : Fumiharu IWASAKI et al.

It is certified that error appears in the above-indentified patent and that said Letters Patent is hereby corrected as shown below:

COLUMN 16

Line 39, "$Li_xSi_{1-y}O_z$" should read --$Li_xSi_{1-y}M_yO_z$--.

Line 45, "$Li_xSi_{1-y}O_z$" should read --$Li_xSi_{1-y}M_yO_z$--.

Line 48, "$Li_xSi_{1-y}O_z$" should read --$Li_xSi_{1-y}M_yO_z$--.

Signed and Sealed this

Fifth Day of November, 1996

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,506,075
DATED : April 9, 1996
INVENTOR(S) : Fumiharu IWASAKI, Kensuke TAHARA, Hideki ISHIKAWA, Seiji YAHAGI, Akifumi SAKATA and Tsugio SAKAI It is certified that error appears in the above-indentified patent and that said Letters Patent is hereby corrected as shown below:

On the Title page, please insert Item --[30]

Foreign Application Priority Data

Mar. 10, 1993 [JP] Japan ..... 5-049716

Apr.  7, 1993 [JP] Japan ..... 5-080944

Apr.  9, 1993 [JP] Japan ..... 5-083682

Dec. 24, 1993 [JP] Japan ..... 5-328379

Jan. 24, 1994 [JP] Japan ..... 6-006023 --.

Signed and Sealed this

Twenty-fourth Day of December, 1996

Attest:

BRUCE LEHMAN

*Attesting Officer*     *Commissioner of Patents and Trademarks*